United States Patent
Huang

(10) Patent No.: US 10,406,746 B2
(45) Date of Patent: Sep. 10, 2019

(54) HEATING HEAD FOR THREE-DIMENSIONAL PRINTING PEN

(71) Applicants: XYZprinting, Inc., New Taipei (TW); Kinpo Electronics, Inc., New Taipei (TW)

(72) Inventor: Hao-Jen Huang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/065,868

(22) Filed: Mar. 10, 2016

(65) Prior Publication Data

US 2017/0190105 A1    Jul. 6, 2017

(30) Foreign Application Priority Data

Dec. 31, 2015  (CN) .......................... 2015 1 1027271

(51) Int. Cl.
    *B29C 64/118*    (2017.01)
    *H05B 3/44*      (2006.01)
    (Continued)

(52) U.S. Cl.
    CPC .......... *B29C 64/118* (2017.08); *B29C 64/209* (2017.08); *B29C 64/295* (2017.08);
    (Continued)

(58) Field of Classification Search
    CPC ....... B29C 67/0055; B33Y 30/00; H05B 3/44; B29K 2055/02; B29K 2067/046; B29K 2105/0067
    (Continued)

(56) References Cited

U.S. PATENT DOCUMENTS

| 5,340,433 A * | 8/1994 | Crump .................... B22F 3/115 |
| | | 118/202 |
| 8,827,684 B1 * | 9/2014 | Schumacher ........... B29C 64/20 |
| | | 425/375 |
| 2006/0182943 A1 * | 8/2006 | Eyhorn ................... C04B 30/00 |
| | | 428/304.4 |

FOREIGN PATENT DOCUMENTS

| CN | 203485448 | 3/2014 |
| CN | 103737935 | 4/2014 |

(Continued)

OTHER PUBLICATIONS

"Office Action of China Counterpart Application", dated Jun. 29, 2018, p. 1-p. 9.

(Continued)

*Primary Examiner* — Ibrahime A Abraham
*Assistant Examiner* — Spencer H. Kirkwood
(74) *Attorney, Agent, or Firm* — JCIPRNET

(57) ABSTRACT

The invention provides a heating head for a three-dimensional printing pen. The heating head includes a heating pipe, a heating member, a heat insulation pipe, a heat insulation sleeve, and a heat sink. The heating member is disposed on the heating pipe. The heat insulation pipe penetrates into the heating pipe. The heat insulation sleeve is sleeved on the heating pipe and opposite to the heating member. The heat insulation sleeve partly covers the heat insulation pipe, and the heat insulation pipe and the heat insulation sleeve are separated by the heating pipe. The heat sink and the heat insulation sleeve mutually lean against, wherein the heat insulation sleeve is located between the heating member and the heat sink, and the heat insulation pipe penetrates into the heat sink.

11 Claims, 3 Drawing Sheets

(51) Int. Cl.
| | |
|---|---|
| *B29C 64/209* | (2017.01) |
| *B29C 64/295* | (2017.01) |
| *B33Y 30/00* | (2015.01) |
| *B29K 55/02* | (2006.01) |
| *B29K 67/00* | (2006.01) |
| *B29K 105/00* | (2006.01) |

(52) U.S. Cl.
CPC ............ *H05B 3/44* (2013.01); *B29K 2055/02* (2013.01); *B29K 2067/046* (2013.01); *B29K 2105/0067* (2013.01); *B33Y 30/00* (2014.12)

(58) Field of Classification Search
USPC ........ 264/308, 309, 299, 319; 219/229, 228, 219/230, 241, 407, 551, 226, 201, 209, 219/531; 242/570; 428/304.4
See application file for complete search history.

(56) References Cited

FOREIGN PATENT DOCUMENTS

| | | | | |
|---|---|---|---|---|
| CN | 203697485 U | * | 7/2014 | |
| CN | 203697487 | | 7/2014 | |
| CN | 203994724 | | 12/2014 | |
| CN | 204622625 U | * | 9/2015 | ......... B29C 67/0055 |

OTHER PUBLICATIONS

"Office Action of China Counterpart Application," dated Mar. 7, 2019, p. 1-p. 8.

* cited by examiner

HEATING HEAD FOR THREE-DIMENSIONAL PRINTING PEN

CROSS-REFERENCE TO RELATED APPLICATION

This application claims the priority benefit of China patent application serial no. 201511027271.7, filed on Dec. 31, 2015. The entirety of the above-mentioned patent application is hereby incorporated by reference herein and made a part of the specification.

BACKGROUND OF THE INVENTION

Field of the Invention

The invention relates to a heating head and specifically relates to a heating head for a three-dimensional printing pen.

Description of Related Art

Along with the continuous development of technology recently, various methods using the additive manufacturing technology to build physical three-dimensional (3-D) models have been proposed, such as building a model layer by layer. Generally speaking, the additive manufacturing technology converts design data of three-dimensional models designed with, for example, computer-aided design softwares into a plurality of thin (pseudo-two-dimensional) cross-sectional layers that are continuously stacked. At the same time, many technical means capable of forming a plurality of thin cross-sectional layers have also been gradually proposed. For example, a printing unit of a three-dimensional printing apparatus may move along an XY plane above the printing platform according to spatial coordinate axes (namely, X-axis, Y-axis, and Z-axis) built from the design data of a three-dimensional model, such that the building material may form a proper shape of a cross-sectional layer, and then, the printing unit is driven to move along the Z-axis layer by layer, so that a plurality of cross-sectional layers are gradually stacked and solidified layer by layer to form the three-dimensional object.

However, the volume of the three-dimensional printing apparatus is comparatively large, so that the three-dimensional printing apparatus has low mobility and high cost. On the other hand, the three-dimensional printing apparatus is mostly used to manufacture large-sized three-dimensional objects, and the three-dimensional printing apparatus is hardly used to actualize specifically the detailed outline of the three-dimensional objects, to build other detailed features on the existing three-dimensional objects, or to repair the damage of the three-dimensional objects. Accordingly, a three-dimensional printing pen having a smaller volume, low cost, and high mobility, etc., emerges. Because the heat source used by the heating wire is disposed inside the three-dimensional printing pen, how to build a good heat-insulation mechanism is becoming more important, so as to prevent the hand gripping the three-dimensional printing pen of the user from being burned or being heated.

SUMMARY OF THE INVENTION

The invention provides a heating head of a three-dimensional printing pen that having a good heat insulation effect.

The invention proposes a heating head for a three-dimensional printing pen. The heating head includes a heating pipe, a heating member, a heat insulation pipe, a heat insulation sleeve, and a heat sink. The heating member is disposed on the heating pipe. The heat insulation pipe penetrates into the heating pipe. The heat insulation sleeve is sleeved on the heating pipe and opposite to the heating member. The heat insulation sleeve partly covers the heat insulation pipe, and the heat insulation pipe and the heat insulation sleeve are separated by the heating pipe. The heat sink and the heat insulation sleeve mutually lean against, wherein the heat insulation sleeve is located between the heating member and the heat sink, and the heat insulation pipe penetrates into the heat sink.

In one embodiment of the invention, the heating pipe has a feeding port and a discharging port opposite to the feeding port. The heat insulation sleeve is adjacent to the feeding port and leans against an outer wall surface of the heating pipe. The heat insulation pipe penetrates into the feeding port and leans against an inner wall surface of the heating pipe, and the heating member is adjacent to the discharging port.

In one embodiment of the invention, the heating head further includes a nozzle. The nozzle is spirally connected to the discharging port of the heating pipe.

In one embodiment of the invention, the heat sink includes a plate portion and a pipe portion connecting to the plate portion. The heat insulation sleeve and the plate portion lean against each other, and the heat insulation pipe penetrates into the pipe portion.

In one embodiment of the invention, the heating head further includes a protective cover. The protective cover covers a part of the heating pipe, the heating member, a part of the heat insulation sleeve, and a part of the heat sink. The protective cover and another part of the heat insulation sleeve lean against each other, and the protective cover and the heat sink are separated by the other part of the heat insulation sleeve.

In one embodiment of the invention, the heat sink has at least one first locking hole. The heat insulation sleeve has at least one second locking hole. The protective cover has at least one third locking hole. The first locking hole, the second locking hole, and the third locking hole are aligned with each other, and the second locking hole is located between the first locking hole and the third locking hole. The heating head further includes a first locking member. The first locking member passes through the first locking hole, the second locking hole, and the third locking hole, so as to fix the heat sink, the heat insulation sleeve, and the protective cover.

In one embodiment of the invention, the heating head further includes a heat dissipation cover. The heat dissipation cover is sleeved on the protective cover and covers a part of the heat sink and a part of the heat insulation sleeve. The heat dissipation cover has a plurality of heat dissipation slots. The heat dissipation slots expose a part of the heat sink and a part of the heat insulation sleeve.

In one embodiment of the invention, a part of the protective cover covered by the heat dissipation cover has at least one fourth locking hole. The heat dissipation cover has at least one fifth locking hole, and the fourth locking hole and the fifth locking hole are aligned with each other. The heating head further includes at least one second locking member. The second locking member passes through the fourth locking hole and the fifth locking hole, so as to fix the protective cover and the heat dissipation cover.

In one embodiment of the invention, the second locking member further passes through at least one sixth locking hole of a main body of the three-dimensional printing pen, so as to fix the protective cover and the heat dissipation cover to the main body.

In one embodiment of the invention, the thermal conductivity coefficient of the heat insulation pipe is from 0.2 to 0.3 W/m·K.

In one embodiment of the invention, the thermal final conductivity coefficient of the heat insulation sleeve is from 0.28 to 0.35 W/m·K.

Based on the above, the heat insulation pipe and the heat insulation sleeve are separated by the heating pipe in the heating head of the invention, wherein the heat sink and the heat insulation sleeve lean against each other, the heating member and the heat sink are separated by the heat insulation sleeve, and the heat insulation pipe penetrates into the heat sink. Therefore, the temperature around the heating pipe is able to be maintained at a high temperature and is not easy to be declined. In addition, the parts of the heat insulation pipe and the heat insulation sleeve that are farther away from the heating pipe has a lower temperature, therefore, the temperature around the heat sink is maintained at a relatively low temperature. The heat sink is relatively closer to the portion of the three-dimensional printing pen that the user grips, so as to prevent the hand gripping the three-dimensional printing pen of the user from being burned or being heated.

In order to make the aforementioned and other features and advantages of the invention more comprehensible, embodiments accompanying figures are described in detail belows.

DESCRIPTION OF THE EMBODIMENTS

Figure 1:
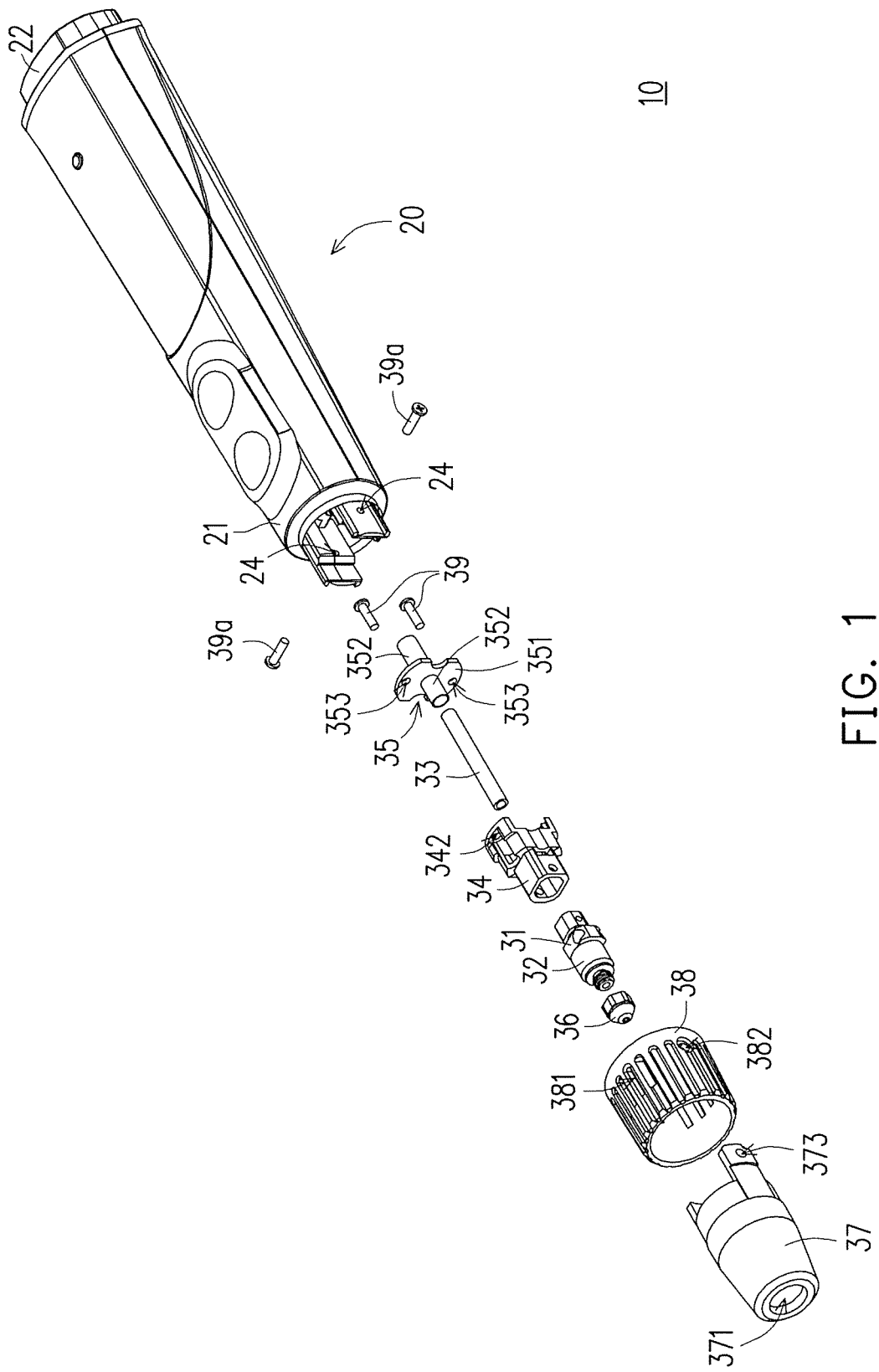
FIG. 1 is a schematic exploded view of a three-dimensional printing pen of an embodiment of the invention.
Figure 2:
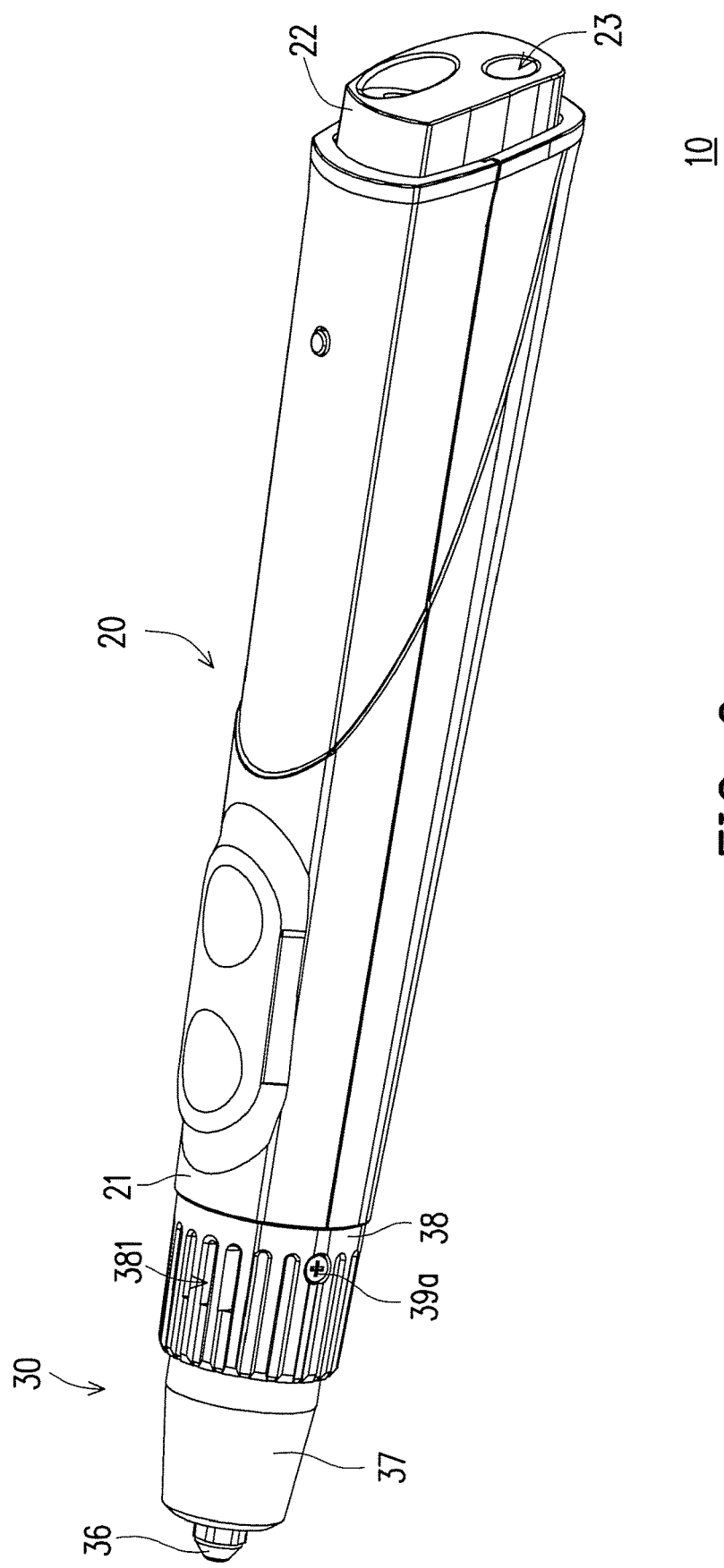
FIG. 2 is schematic view of the three-dimensional printing pen in FIG. 1 after being assembled.
Figure 3:
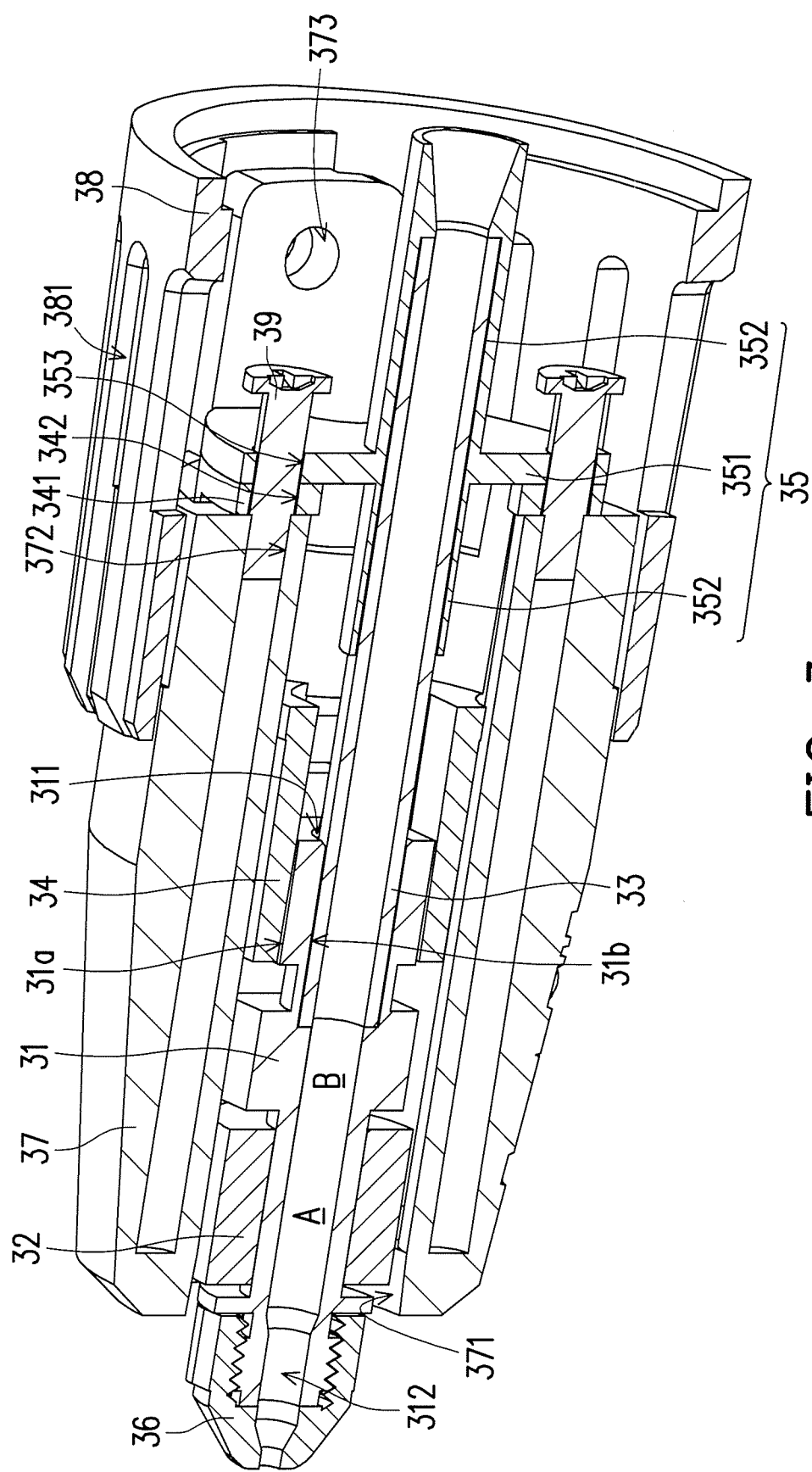
FIG. 3 is a schematic cross-sectional view of a heating head in FIG. 2.

FIG. 1 is a schematic exploded view of a three-dimensional printing pen of an embodiment of the invention. FIG. 2 is schematic view of the three-dimensional printing pen in FIG. 1 after being assembled. FIG. 3 is a schematic cross-sectional view of a heating head in FIG. 2. Referring to FIGS. 1-3, in the present embodiment, a three-dimensional printing pen 10 includes a main body 20 and a heating head 30. The main body 20 is configured to have a control unit (not shown) and a driving unit (not shown). The control unit (not shown) is used to control the heating head 30 to be on or off. The driving unit (not shown) is used to drive the wire (not shown) to move-in or move-out the heating head 30. The main body 20 includes a first end part 21 and a second end part 22 opposite to each other. The heating head 30 may be detachably assembled with the first end part 21. The wire (not shown) may enter inside of the main body 20 from an opening 23 of the second end part 22, and is driven by the driving unit (not shown) to move to the heating head 30. The heating head 30 heats the wire (not shown) to raise the temperature of the wire to the melting point, the heating head 30 spurts the melted wire (not shown) out, and the user can hold the three-dimensional printing pen 10 by hand to draw three-dimensional patterns or three-dimensional objects. In general, the wire (not shown) may be made of acrylonitrile butadiene styrene (ABS) or polylactic acid (PLA), wherein the melting point of acrylonitrile butadiene styrene is about 210 degrees Celsius, and the melting point of polylactic acid is about 180 degrees Celsius.

The heating head 30 includes a heating pipe 31, a heating member 32, a heat insulation pipe 33, a heat insulation sleeve 34, and a heat sink 35. The heating member 32 is disposed on the heating pipe 31 and electrically connected with the control unit (not shown) of the main body 20. Therefore, the control unit (not shown) may be used to control the electric current to the heating member 32 to make the heating member 32 generate heat. As shown in FIG. 2 and FIG. 3, the heating member 32 is, for example, disposed surrounding the outer peripheral surface of the heating pipe 31 and thermally coupled to the heating pipe 31, so that the heat generated by the heating member 32 may be conducted to the heating pipe 31. Herein, the material of the heating pipe 31 may be aluminum, or other metals or alloys with high thermal conductivity, or may be diamond-like carbon, nanometer carbon, or high molecular materials with high thermal conductivity.

The heat insulation pipe 33 penetrates into the heating pipe 31 and a distance is kept between the heat insulation pipe 33 and the heating member 32 disposed on the heating pipe 31. The heat insulation sleeve 34 is sleeved on the heating pipe 31. The heat insulation sleeve 34 and the heating member 32 are disposed opposite to each other, and a distance is kept between the heat insulation sleeve 34 and the heating member 32. In the present embodiment, the heating pipe 31 has a feeding port 311 and a discharging port 312 opposite to the feeding port 311, wherein the heat insulation sleeve 34 is adjacent to the feeding port 311 and leans against an outer wall surface 31a of the heating pipe 31, and the heating member 32 is adjacent to the discharging port 312. One end of the heat insulation pipe 33 penetrates into the feeding port 311 and leans against an inner wall surface 31b of the heating pipe 31. As shown in FIG. 3, the heat insulation pipe 33 and the heat insulation sleeve 34 are respectively disposed inside and outside of the heating pipe 31, and a part of the heat insulation pipe 33 that is exposed to outside of the heating pipe 31 is not in contact with a part of the heat insulation sleeve 34 that does not lean against the outer wall surface 31a of the heating pipe 31, and the heat insulation pipe 33 and the heat insulation sleeve 34 are separated by the heating pipe 31. In the present embodiment, the part of the heat insulation sleeve 34 that does not lean against the outer wall surface 31a of the heating pipe 31 surrounds the part of the heat insulation pipe 33 that is exposed to outside of the heating pipe 31, that is to say, the heat insulation sleeve 34 partly covers the heat insulation pipe 33. On the other hand, the heat sink 35 and the bottom 341 of the heat insulation sleeve 34 lean against each other, wherein the heat insulation sleeve 34 is located between the heating member 32 and the heat sink 35, and the heat insulation pipe 33 penetrates into the heat sink 35. In other words, two end parts of the heat insulation pipe 33 penetrate into the heating pipe 31 and the heat sink 35 respectively, and the heating pipe 31 and the heat sink 35 are separated by the heat insulation sleeve 34. More specifically, the heat sink 35 includes a plate portion 351 and a pipe portion 352 connecting to the plate portion 351. The bottom 341 of the heat insulation sleeve 34 and the plate portion 351 lean against each other, and one end of the heat insulation pipe 33 penetrates into the pipe portion 352. As shown in FIG. 3, the pipe portion 352 is extended outwardly from two opposite sides the plate portion 351, and a part of the pipe portion 352 is covered by the heat insulation sleeve 34. The end of the heat insulation pipe 33 penetrates into a part of the pipe portion 352 that is covered by the heat insulation sleeve 34 and is extended to another part of the pipe portion 352 that is not covered by the heat insulation sleeve 34.

In the present embodiment, the heating head 30 further includes a nozzle 36. The nozzle 36 is spirally connected to the discharging port 312 of the heating pipe 31. Considering the feeding path of the wire (not shown), firstly, the wire (not shown) may enter inside of the main body 20 from an opening 23 of the second end part 22, and is driven by the driving unit (not shown) to move into the pipe portion 352 of the heat sink 35. Subsequently, the wire (not shown) moves to the heat insulation pipe 33 penetrating into the pipe portion 352, and moves through the heat insulation pipe 33 into the heating pipe 31. After that, the heating member 32 generates heat and the heat is conducted to the heating pipe 31, so as to maintain the temperature of a block A of the heating pipe 31 corresponding to the heating member 32 at about 210 degrees Celsius, and to maintain the temperature of a block B between the block A and the feeding port 311 at about 170 degrees Celsius. On the other hand, the temperature of the feeding port 311 of the heating pipe 31 is maintained at about 160 degrees Celsius. Therefore, when moving into the heat insulation pipe 33 penetrating into the feeding port 311 and the block B of the heating pipe 31, the wire (not shown) begins to soften. After moving into the block A of the heating pipe 31, the softened wire (not shown) begins to melt. At this time, the melted wire (not shown) may spurt through the discharging port 312 of the heating pipe 31 and the nozzle 36.

In other words, in order to melt the wire (not shown) successfully, the temperature around the heating pipe 31 needs being maintained from 160 to 210 degrees Celsius. In the present embodiment, the material of the heat insulation pipe 33 is polytetra fluoroethylene having a thermal conductivity coefficient from 0.2 to 0.3 W/m·K. The material of the heat insulation sleeve 34 may be nylon PA66-GF30 having a thermal conductivity coefficient from 0.28 to 0.35 W/m·K. Under the circumstance that a material having a lower thermal conductivity coefficient is used to form the heat insulation pipe 33 and the heat insulation sleeve 34, the heat conduction velocity from the heating pipe 31 to the heat insulation pipe 33 and the heat insulation sleeve 34 is slow. On the other hand, the heating member 32 and the heat sink 35 are separated by the heat insulation sleeve 34, and the heat insulation pipe 33 and the heat insulation sleeve 34 are separated by the heating pipe 31, therefore, the temperature around the heating pipe 31 is maintained from 160 to 210 degrees Celsius and is not easy to be declined. In addition, the parts of the heat insulation pipe 33 and the heat insulation sleeve 34 that are farther away from the heating pipe 31 has a lower temperature, therefore, the temperature around the heat sink 35 is maintained at about 60 degrees Celsius. The heat sink 35 is relatively closer to the portion of the main body 20 that the user grips, therefore, the temperature of the portion of the main body 20 that the user grips may be maintained under 60 degrees Celsius, so as to prevent the hand gripping the main body 20 of the user from being burned or being heated.

Referring to FIGS. 1-3, in the present embodiment, the heating head 30 further includes a protective cover 37 and a heat dissipation cover 38. The protective cover 37 covers a part of the heating pipe 31, the heating member 32, a part of the heat insulation sleeve 34, and a part of the heat sink 35, and the nozzle 36 passes through the opening 371 of the protective cover 37. On the other hand, the plate portion 351 of the heat sink 35 and the bottom 341 of the heat insulation sleeve 34 lean against each other, the protective cover 37 and the bottom 341 of the heat insulation sleeve 34 lean against each other, and the protective cover 37 and the heat sink 35 are separated by the bottom 341 of the heat insulation sleeve 34. The heat dissipation cover 38 is sleeved on the protective cover 37 and covers a part of the heat sink 35 and a part of the heat insulation sleeve 34. The heat dissipation cover 38 has a plurality of heat dissipation slots 381, and the heat dissipation slots 381 expose a part of the heat sink 35 and a part of the heat insulation sleeve 34. Therefore, the heat conducted to the bottom 341 of the heat insulation sleeve 34, the heat conducted from the bottom 341 of the heat insulation sleeve 34 to the heat sink 35, and the heat conducted from the heat insulation pipe 33 to the heat sink 35 can be discharged to the outside through the heat dissipation slots 381, so that the temperature around the heat sink 35 is maintained at about 60 degrees Celsius.

More specifically, the heat sink 35 has at least one first locking hole 353 (schematically illustrated as two first locking holes), the two first locking holes 353 are located at the plate portion 351 of the heat sink 35. The heat insulation sleeve 34 has at least one second locking hole 342 (schematically illustrated as two second locking holes), the two second locking holes 342 are located at the bottom 341 of the heat insulation sleeve 34. The protective cover 37 has at least one third locking hole 372 (schematically illustrated as two third locking holes), wherein each of the first locking holes 353, the corresponding second locking hole 342, and the corresponding third locking hole 372 are aligned with each other, and each of the second locking holes 342 is located between the corresponding first locking hole 353 and the corresponding third locking hole 372. In the present embodiment, the heating head 30 further includes at least one first locking member 39 (schematically illustrated as two first locking members), and each of the first locking members 39 respectively passes through the first locking hole 353, the second locking hole 342, and the third locking hole 372 that are aligned with each other, so as to fix the heat sink 35, the heat insulation sleeve 34, and the protective cover 37. On the other hand, a part of the protective cover 37 covered by the heat dissipation cover 38 has at least one fourth locking hole 373 (schematically illustrated as two fourth locking holes). The heat dissipation cover 38 has at least one fifth locking hole 382, and each of the fourth locking holes 373 and the corresponding fifth locking hole 382 are aligned with each other. The heating head 30 further includes at least one second locking member 39a (schematically illustrated as two second locking members), and each of the second locking members 39a respectively passes through the fourth locking hole 373 and the fifth locking hole 382 that are aligned with each other, so as to fix the protective cover 37 and the heat dissipation cover 38. More specifically, the main body 20 has at least one sixth locking hole 24 (schematically illustrated as two sixth locking holes), the two sixth locking holes 24 are located adjacent to the first end part 21. Each of the sixth locking holes 24, the corresponding fourth locking hole 373, and the corresponding fifth locking hole 382 are aligned with each other, and each of the sixth locking holes 24 is located between the corresponding fifth locking hole 382 and the corresponding fourth locking hole 373. Each of the second locking members 39a, for example, passes through the corresponding fifth locking hole 382 and sequentially passes through the corresponding sixth locking hole 24 and the corresponding fourth locking hole 373, so as to fix the protective cover 37 and the heat dissipation cover 38 to the main body 20. According to the above assembly method, the heating head 30 is able to be firmly disposed on the main body 20, so as to improve the reliability in operation. In another way, the heating head 30 may be disassembled and it is convenient for the user to repair or to replace components.

In summary, the heat insulation pipe and the heat insulation sleeve are separated by the heating pipe in the heating head of the invention, wherein the heat sink and the heat insulation sleeve lean against each other, the heating member and the heat sink are separated by the heat insulation sleeve, and the heat insulation pipe penetrates into the heat sink. Because the heat insulation pipe and the heat insulation sleeve are formed by materials having low thermal conductivity coefficient, the heat conduction velocity from the heating pipe to the heat insulation pipe and the heat insulation sleeve is slow, and therefore, the temperature around the heating pipe is able to be maintained at a high temperature and is not easy to be declined. In addition, the parts of the heat insulation pipe and the heat insulation sleeve that are farther away from the heating pipe has a lower temperature, therefore, the temperature around the heat sink is maintained at a relatively low temperature. On the other hand, the heat dissipation slots may expose a part of the heat sink and a part of the heat insulation sleeve. Therefore, the heat conducted to the heat insulation sleeve, the heat conducted from the heat insulation sleeve to the heat sink, and the heat conducted from the heat insulation pipe to the heat sink, and all the heat from the heat sink can be discharged to the outside through the heat dissipation slots, so that the temperature around the heat sink is maintained at a relatively low temperature. In other words, the heating head of the invention may have good heat dissipation and heat insulation effects. The heat sink is relatively closer to the portion of the three-dimensional printing pen that the user grips, so as to prevent the hand gripping the three-dimensional printing pen of the user from being burned or being heated.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A heating head, for a three-dimensional printing pen, comprising:
   a heating pipe;
   a heating member, disposed on the heating pipe;
   a heat insulation pipe, penetrating into the heating pipe;
   a heat insulation sleeve, sleeved on the heating pipe, not sleeved on the heating member, wherein the heat insulation sleeve partly covers the heat insulation pipe, the heat insulation pipe and the heat insulation sleeve are separated by the heating pipe; and
   a heat sink, mutually leaning against the heat insulation sleeve, wherein the heat insulation sleeve is located between the heating member and the heat sink; and
   a protective cover, covering a part of the heating pipe and the heating member, wherein the protective cover covers a part of the heat insulation sleeve and a part of the heat sink, wherein the protective cover and another part of the heat insulation sleeve lean against each other, and the protective cover and the heat sink are separated by the other part of the heat insulation sleeve.

2. The heating head as recited in claim 1, wherein the heating pipe has a feeding port and a discharging port opposite to the feeding port, the heat insulation sleeve is adjacent to the feeding port and leans against an outer wall surface of the heating pipe, the heat insulation pipe penetrates into the feeding port and leans against an inner wall surface of the heating pipe, and the heating member is adjacent to the discharging port.

3. The heating head as recited in claim 2, further comprising:
   a nozzle, spirally connected to the discharging port of the heating pipe.

4. The heating head are recited in claim 1, wherein the heat sink comprises a plate portion and a pipe portion connecting to the plate portion, the heat insulation sleeve and the plate portion lean against each other, and the heat insulation pipe penetrates into the pipe portion.

5. The heating head as recited in claim 1, wherein the heat sink has at least one first locking hole, the heat insulation sleeve has at least one second locking hole, and the protective cover has at least one third locking hole, wherein the at least one first locking hole, the at least one second locking hole, and the at least one third locking hole are aligned with each other, the at least one second locking hole is located between the at least one first locking hole and the at least one third locking hole, the heating head further comprises at least one first locking member, and the at least one first locking member passes through the at least one first locking hole, the at least one second locking hole, and the at least one third locking hole, so as to fix the heat sink, the heat insulation sleeve, and the protective cover.

6. The heating head as recited in claim 5, further comprising:
   a heat dissipation cover, sleeved on the protective cover, and covering a part of the heat sink and a part of the heat insulation sleeve, wherein the heat dissipation cover has a plurality of heat dissipation slots, the heat dissipation slots expose a part of the heat sink and a part of the heat insulation sleeve.

7. The heating head as recited in claim 6, wherein a part of the protective cover covered by the heat dissipation cover has at least one fourth locking hole, the heat dissipation cover has at least one fifth locking hole, the at least one fourth locking hole and the at least one fifth locking hole are aligned with each other, the heating head further comprises at least one second locking member, and the at least one second locking member passes through the at least one fourth locking hole and the at least one fifth locking hole, so as to fix the protective cover and the heat dissipation cover.

8. The heating head as recited in claim 7, wherein the at least one second locking member further passes through at least one sixth locking hole of a main body of the three-dimensional printing pen, so as to fix the protective cover and the heat dissipation cover to the main body.

9. The heating head as recited in claim 1, wherein a thermal conductivity coefficient of the heat insulation pipe is from 0.2 to 0.3 W/m·K.

10. The heating head as recited in claim 1, wherein a thermal conductivity coefficient of the heat insulation sleeve is from 0.28 to 0.35W/m·K.

11. The heating head as recited in claim 1, wherein the heat insulation pipe penetrates into the heat sink.

* * * * *